US008352530B2

(12) United States Patent
Dao et al.

(10) Patent No.: US 8,352,530 B2
(45) Date of Patent: Jan. 8, 2013

(54) RESIDUE CALCULATION WITH BUILT-IN CORRECTION IN A FLOATING POINT UNIT POSITIONED AT DIFFERENT LEVELS USING CORRECTION VALUES PROVIDED BY MULTIPLEXER

(75) Inventors: Son T. Dao, Stuttgart (DE); Juergen G. Haess, Schoenaich (DE); Michael Klein, Schoenaich (DE); Michael K. Kroener, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 12/329,784

(22) Filed: Dec. 8, 2008

(65) Prior Publication Data

US 2010/0146027 A1 Jun. 10, 2010

(51) Int. Cl.
*G06F 7/38* (2006.01)
(52) U.S. Cl. ........ 708/491; 708/492; 708/209; 708/233; 708/530
(58) Field of Classification Search .................. 708/209, 708/233, 491, 530
See application file for complete search history.

(56) References Cited

U.S. PATENT DOCUMENTS

| | | | | |
|---|---|---|---|---|
| 4,742,479 A | * | 5/1988 | Kloker et al. ............... | 708/491 |
| 5,742,533 A | * | 4/1998 | Moncsko ..................... | 708/530 |
| 7,363,335 B2 | * | 4/2008 | Shimbo ....................... | 708/491 |
| 7,769,795 B1 | * | 8/2010 | Iacobovici .................. | 708/233 |
| 8,024,647 B2 | * | 9/2011 | Busaba et al. ............... | 714/808 |

OTHER PUBLICATIONS

IEEE Standard for Floating-Point Arithmetic; IEEE Computer Society; Aug. 29, 2008.*
Distributed Residue-Checking of a Floating Point Unit, U.S. Appl. No. 12/253,713, filed Oct. 17, 2008.

* cited by examiner

*Primary Examiner* — Tammara Peyton
(74) *Attorney, Agent, or Firm* — Cantor Colburn LLP; John Campbell

(57) ABSTRACT

A residue generator for calculation and correction of a residue value. The residue generator includes a residue-generation tree connected with an operand register at an input of the residue generator including a plurality of register-bits receiving and carrying bits of numerical data. The residue-generation tree includes a multiplexer connected with respective register-bits which carry unused bits, and selectively providing logical zeros or a correction value when provided, at the respective register-bits carrying the unused bits, a plurality of decoders, each decoder receiving the bits of numerical data from the respective registers-bits including the logical zeros or the correction value when provided and decoding the numerical data, and a plurality of residue condensers, receiving the decoded numerical data from the decoders including the logical zeros or the correction value when provided, and calculating the residue value and correcting while calculating the residue value using the correction value when provided by the multiplexer.

17 Claims, 5 Drawing Sheets

US 8,352,530 B2

RESIDUE CALCULATION WITH BUILT-IN CORRECTION IN A FLOATING POINT UNIT POSITIONED AT DIFFERENT LEVELS USING CORRECTION VALUES PROVIDED BY MULTIPLEXER

STATEMENT OF GOVERNMENT INTEREST

This invention was made with Government support under Contract No.: HR0011-07-9-0002 awarded by DARPA. The Government has certain rights to this invention.

BACKGROUND

The present invention relates to residue calculation and correction within a floating-point unit (FPU) of a microprocessor, and more specifically, to residue calculation with built-in correction eliminating a need for additional circuitry or logic delay.

A conventional FPU of a microprocessor typically includes a residue checking apparatus which performs residue checking for detecting errors in arithmetic floating-point operations such as addition, subtraction, multiplication, division, square root or convert operations. The residue checking is performed within a checking flow by performing the same operations on the residue as those performed on the operands of the FPU. That is, a checking flow is performed in parallel to a data flow within the FPU. In FIG. 1, a data flow 1 and a checking flow 2 of a conventional residue checking apparatus for a FPU are shown. Operands A, B and C are provided by an input register 3 in the data flow 1. The operands A, B and C are processed differently based on different functional elements 4 e.g., an aligner 21 and a normalizer 22, and a result is provided by a result register 5.

Residues are generated at specified positions within the data flow 1 by residue generators 6. When performing residue-checking of the FPU, several residue calculations are performed via the checking flow 2 in parallel with the data flow 1 performing the operations on the data. Therefore, modulo decoders 7 are connected to the residue generators 6 and provide residue modulos to different functional elements 8 such as a modulo multiplier 16, modulo adder 17, modulo subtract 18, modulo add/sub 19, and modulo subtract 20 within the checking flow 2. In the first stage 10 of the checking flow 2, the residue modulos of operands A and B are multiplied by the modulo multiplier 16. In the second stage 11, the residue modulo from operand B is added to the product-residue modulo from stage 10 via the modulo adder 17. In the third stage 12, the residue modulo of bits lost at the aligner 21 is subtracted by the modulo subtract 18 from the sum of the second stage 11. During, the residue checking operation, residue corrections to the actual residue value corresponding to the manipulated data in the data flow 1 may be necessary. For example, a small correction amount such as +/−1 may be necessary. Therefore, in the fourth stage 13, residue correction of +/−1 is performed by the modulo add/sub 19. Then, in the fifth stage 14, a residue-subtract of bits lost at the normalizer 22 is performed by the modulo subtract 20. In the sixth stage 15, a single check operation is performed by a compare element 9. The compare element 9 compares the result provided by the modulo subtract 20 with the residue modulo of the result provided by the result register 5 of the data flow 1.

Each residue generator 6 includes a residue generation tree 23 as shown in FIG. 2. FIG. 2 illustrates a conventional modulo 15 residue-generation tree 23, for example. Different residue values other than residue 15 are also utilized. As shown in FIG. 2, register-bits of an operand register 24 carry 32 bits of an operand, starting with the most significant bit (MSB) in the register-bit indicated with "0" on the left, and ending with the least significant bit (LSB) in the register-bit indicated with "31" on the right. The residue-generation tree 23 includes a plurality of modulo 15 decoders 26 and a plurality of residue condensers 28. Each modulo 15 decoder 26 is connected with four adjacent register-bits of the operand register 23 for receiving in parallel four bits of numerical data. Every adjacent pair of modulo 15 decoders 26 is connected to a residue condenser 28. Further, each residue condenser 28 is connected to two residue condensers 28 from a previous stage. According to $m=2^b-1$, a number of segment bits $b=4$ is required to receive a modulo base $m=15$. According to $w=p*b$ the number of segments $p=8$ in combination with an operand with an operand width w of $w=32$. In the conventional residue generation tree 23, the number input into the residue generator 6 typically does not use all of the input bits because floating point data include a mantissa and an exponent, and the exponent is extracted and handled separately. Therefore, the register-bits that contain the exponent-bits at the entrance (as indicated by the arrows 29) now containing the MSBs or LSBs of the number are filled with logical zeros and are not used to generate a residue value. Also, to save design and circuitry-work in the floating point unit, the same residue-generating macro is typically used multiple times for the different residue-generation-points within the unit, and since these residue generators do not all need the full width of the dataflow, typically some bits of these residue generators are unused and are tied to zero.

SUMMARY

The present invention provides a residue generator for a residue checking apparatus capable of performing residue calculation and correction, to eliminate the need for extra hardware such as a modulo add/sub separately performing residue corrections, and to prevent additional logic-delay.

According to one embodiment of the present invention, a residue generator of a residue checking apparatus for calculation and correction of a residue value. The residue generator includes a residue-generation tree connected with an operand register at an input of the residue generator, including a plurality of register-bits which receive and carry bits of numerical data. The residue-generation tree includes a multiplexer connected with respective register-bits which carry unused bits, and selectively providing at least one of logical zeros or a correction value when provided, at the respective register-bits carrying the unused bits, a plurality of decoders, each decoder receiving the bits of numerical data from the respective registers-bits including the least one of logical zeros or the correction value when provided and decoding the numerical data, and a plurality of residue condensers positioned at different levels, and receiving the decoded numerical data from the decoders including the at least one of logical zeros or the correction value when provided, and calculating the residue value and correcting while calculating the residue value using the correction value when provided by the multiplexer.

According to another embodiment, a distributed residue checking apparatus for a floating point unit having a plurality of functional elements performing floating-point operations on a plurality of operands is provided. The distributed residue checking apparatus includes a plurality of residue generators which calculate residue values for the operands and the functional elements and including specified residue generators of the plurality of residue generators which calculate the residue values and correct the calculated residue values, simultaneously, and a plurality of residue checking units distributed throughout the floating point unit, each residue checking unit receiving a first residue value and a second residue value from respective residue generators and comparing the first residue value to the second residue value to determine whether an error has occurred in a floating-point operation performed by a respective functional element.

According to another embodiment, a method of calculating and correcting a residue value via a residue generator including a residue-generation tree is provided. The method includes receiving and carrying bits of numerical data in an operand register having a plurality of register-bits, connecting a multiplexer to respective register-bits carrying unused bits, selectively providing, via the multiplexer, at least one of logical zeros or a correction value at the respective register-bits carrying the unused bits, decoding, via decoders, the bits of numerical data including the at least one of logical zeros or the correction value when provided, inputting to a plurality of residue condensers, the decoded numerical data including the at least one of logical zeros and a correction value when provided, and calculating the residue value and correcting it while calculating, via the plurality of residue condensers when the correction value is provided by the multiplexer.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 3:
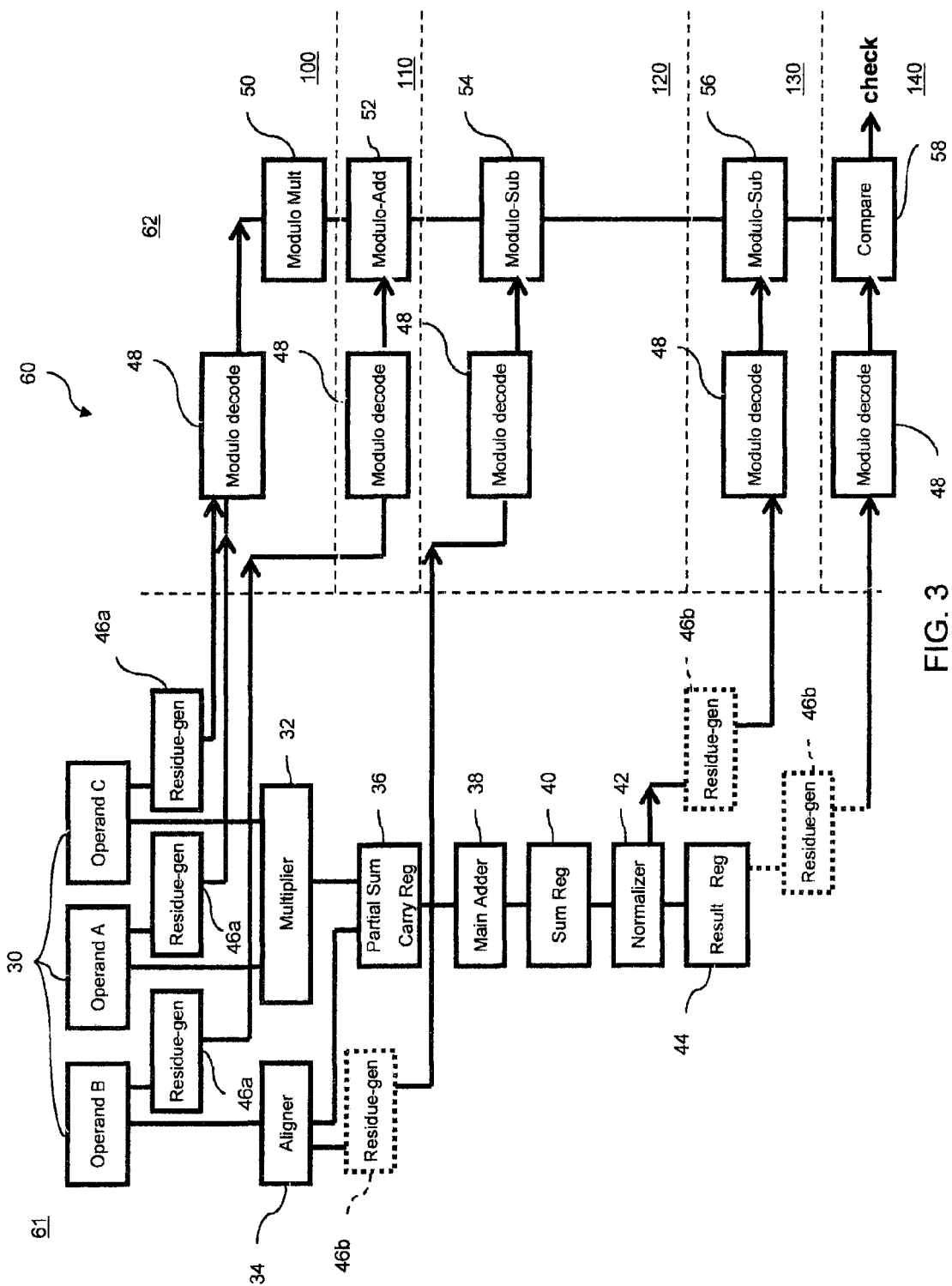
FIG. 3 is a schematic diagram illustrating a residue checking apparatus including residue generators that can be implemented within embodiments of the present invention.

With reference now to FIG. 3, there is a residue checking apparatus including residue generators for a floating point unit that can be implemented within an embodiment of the present invention. The present invention is not limited to floating point calculations and may be used on binary or decimal operations, for example.

As shown in FIG. 3, a data flow 61 and a checking flow 62 of a residue checking apparatus for a FPU 60 is shown. Operands A, B and C are provided by an input register 30 in the data flow 1. A plurality of functional elements is also provided to perform floating-point operations on the plurality of operands A, B and C. The plurality of functional elements include, for example, a multiplier 32, an aligner 34, a partial sum and carry register 36, a main adder 38, a sum register 40 for the main adder 38, and a normalizer 42. As shown in FIG. 3, operands A and C are input into a multiplier 32 and the operand B is input into the aligner 34. The result of the aligner 34 and the product result of the multiplier 32 are then input into the partial sum and carry register 36. The results of the aligner 34 and the multiplier 32 are then added together via the main adder 38 and the sum is placed in the sum register 40. The results of the sum register 40 are input into the normalizer 42 which performs a normalization operation. The results of the normalizer 42 are then input into a result register 44.

Figure 1:
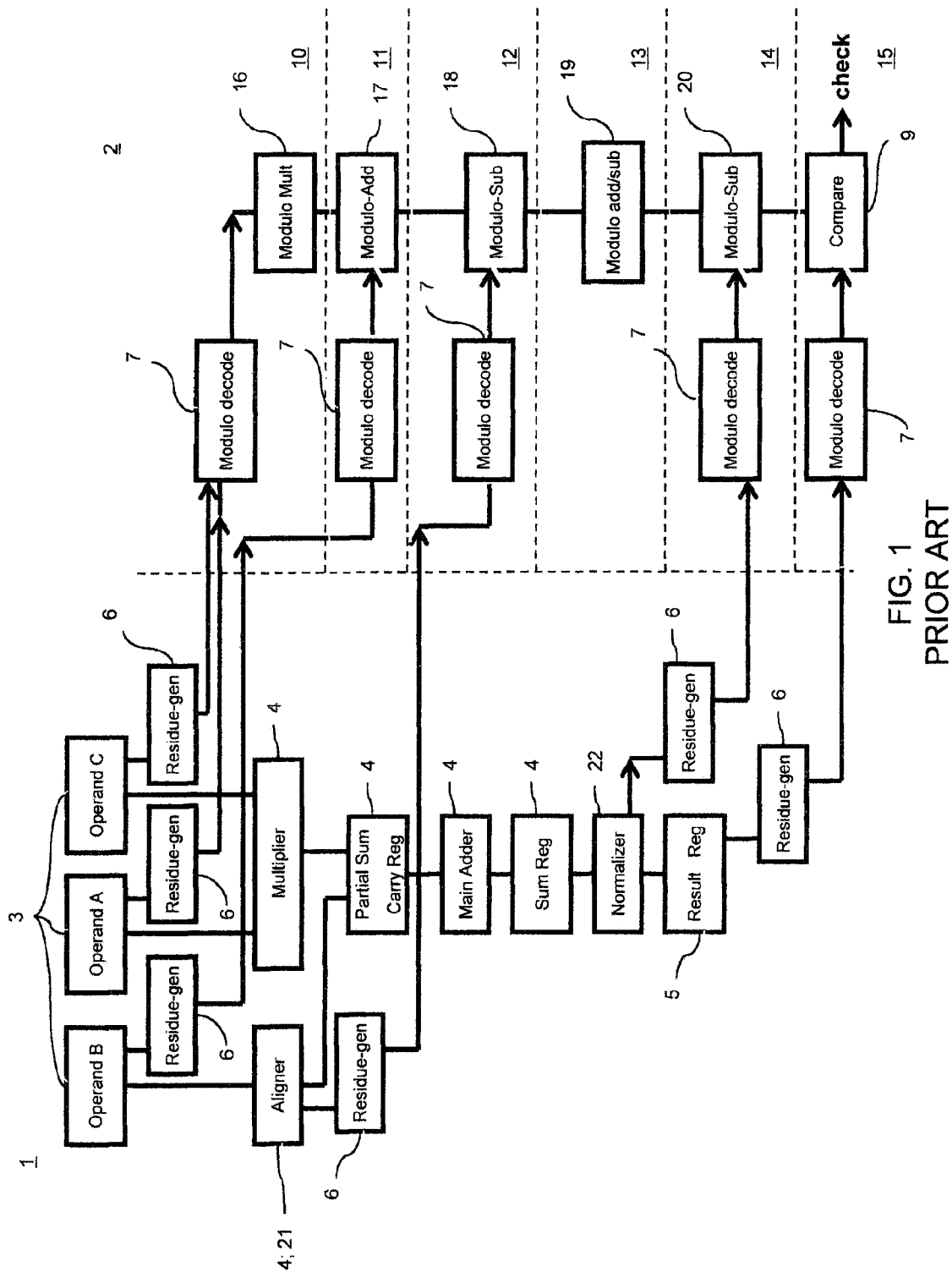
FIG. 1 is a schematic diagram illustrating a conventional residue checking apparatus for a floating point unit (FPU).
Figure 2:
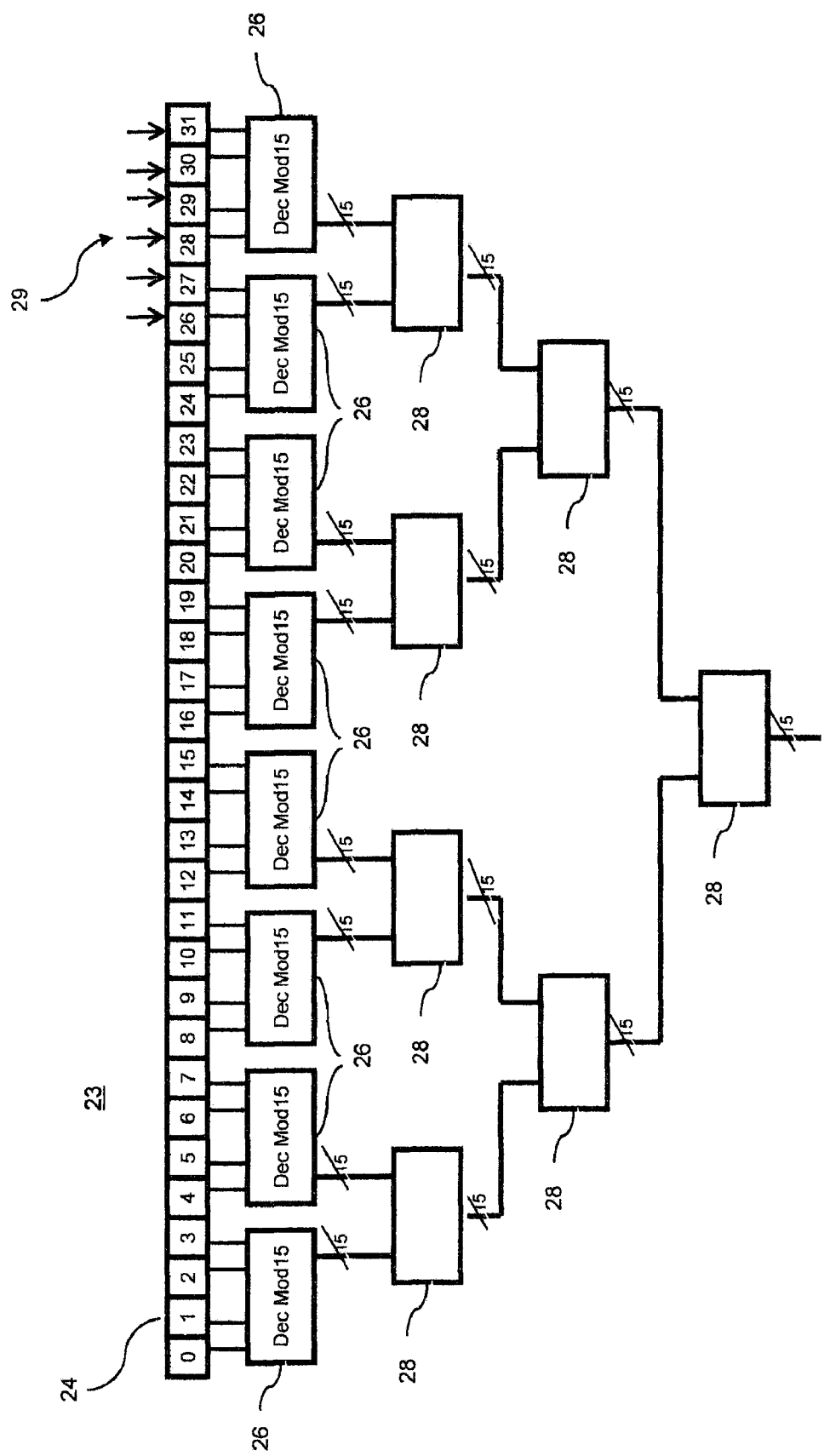
FIG. 2 is a schematic diagram illustrating a conventional modulo 15 residue generation tree.

Residue values are generated at specified positions within the data flow 61 by residue generators 46a and 46b. According to one embodiment of the present invention, the residue generators 46a function in a same manner as the conventional residue generators 6 shown in FIG. 1, for example. According to one embodiment, in addition to calculating the residue values of the aligner 34, the normalizer 42 and the result register 44, the residue generators 46b (as indicated by the dashed boxes) may also receive a correction value from a control logic (not shown) to correct while calculating the residue values such that the residue calculation and correction may be performed, simultaneously, for example. That is, the present invention supplies a correction value into the residue generators 46b to correct the residue value while it is being calculated. Additional details concerning features of the residue generators 46b will be discussed below with reference to FIG. 4.

Further in FIG. 3, according to one embodiment, the checking flow 62 includes modulo decoders 48 that are connected to the residue generators 46a and 46b and provide residue modulos to different residue functional elements such as a modulo multiplier 50, modulo adder 52, modulo subtract 54, and modulo subtract 56. In this embodiment of the present invention, since the residue generators 46b both calculate and correct the residue values, an additional modulo add/sub functional element (as shown in the prior art in FIG. 1) is unnecessary, thereby decreasing the need for additional hardware and logic-delay. Further, additional residue correction is not needed within the checking flow 62. A residue checking operation of the checking flow 62 will now be described below.

In the first stage 100, the residue modulos of operands A and B are multiplied by the modulo multiplier 50. In the second stage 110, the residue modulo from operand B is added to the product-residue modulo from stage 100 via the modulo adder 52. In the third stage 120, the residue modulo of bits lost at the aligner 34 is subtracted by the modulo subtract 54 from the sum of the second stage 110. In the fourth stage 130, a residue-subtract of bits lost at the normalizer 42 is performed by the modulo subtract 56. In the fifth stage 15, a single check operation is performed by a compare element 58. The compare element 58 compares the result provided by the modulo subtract 56 with the residue modulo of the result provided by the result register 44 of the data flow 61. A detailed description of the residue generators 46b will now be described below with reference to FIG. 4.

Figure 4:
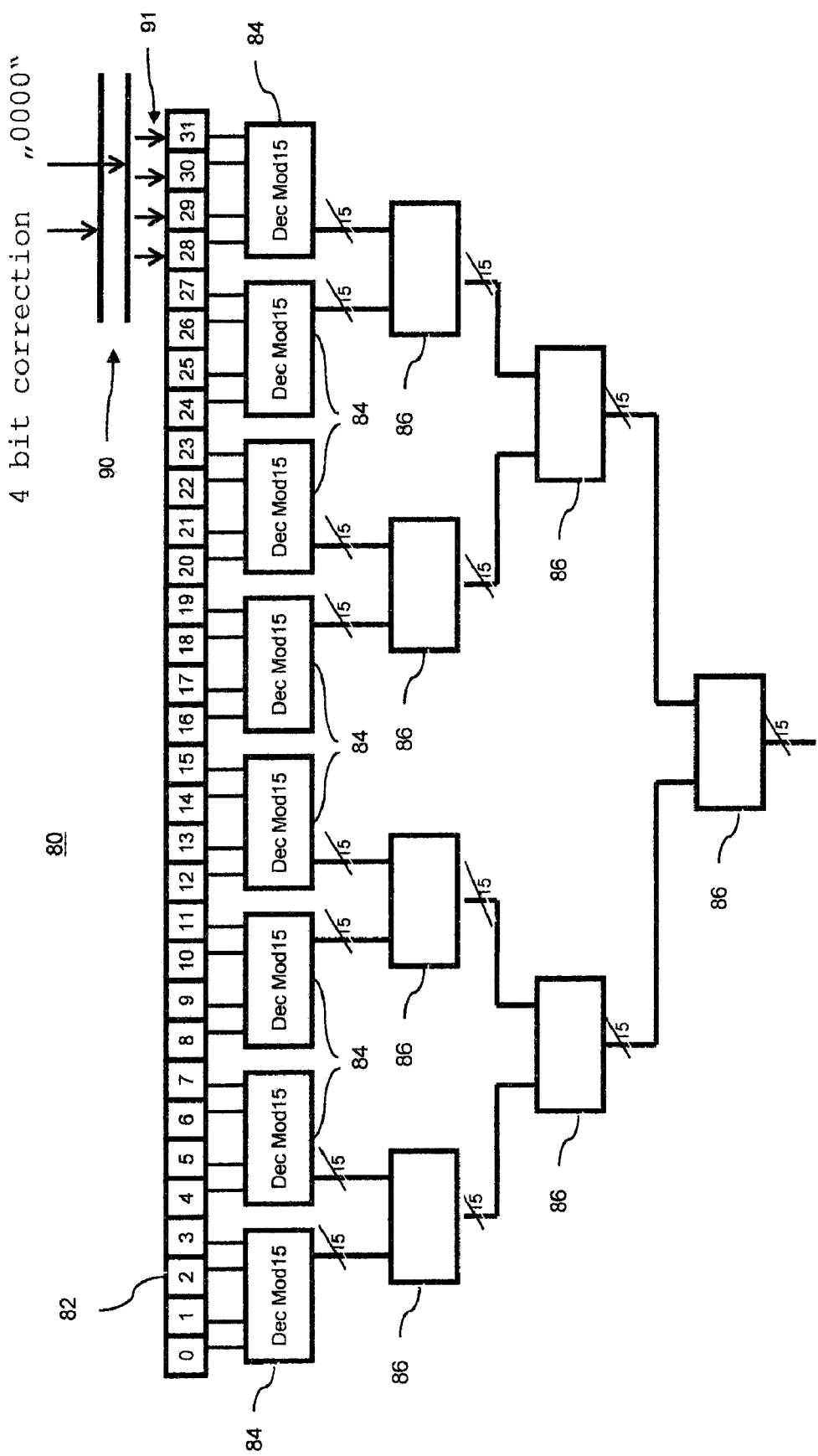
FIG. 4 is a schematic diagram illustrating a modulo 15 residue-generation tree that can be implemented within embodiments of the present invention.

FIG. 4 is a schematic diagram of a modulo 15 residue-generation tree of each residue generator 46b, according to an exemplary embodiment of the present invention. The present invention is not limited to a modulo 15 residue-generation tree and may vary, as necessary. As shown in FIG. 4, according to an embodiment of the present invention, a residue generation tree 80 of each residue generator 46b is connected with an operand register 82 at an input of the residue generator 46b, and having a plurality of register-bits. According to an embodiment of the present invention, the operand register 82 is included in the dataflow to be checked. The register-bits of an operand register 82 receive and carry 32 bits of numerical data of an operand, for example, in successive order from the most significant bit (MSB) in the register-bit indicated with "0" on the left, to the least significant bit (LSB) in the register-bit indicated with "31" on the right, for example. The present invention is not limited to a data flow width of 32 bits, and may vary accordingly. According to alternative embodiments, the data flow width may be 64 bits or 128 bits, for example.

According to an embodiment, the residue-generation tree 80 includes a plurality of modulo 15 decoders 84, a plurality of residue condensers 86. Each modulo 15 decoder 84 is connected with four adjacent register-bits of the operand register 82 for receiving in parallel four bits of numerical data according to residue 15 as used in this example. According to an alternative embodiment, a residue 7 would e.g. use 3 bits. The modulo 15 decoders 84 each decode the numerical data received from the respective register-bits. That is, the decoders 84 transform coded signals, which are in binary format, for example, into decoded signals which are modulo remainders, for example. Each adjacent pair of modulo 15 decoders 86 is connected to a residue condenser 86. The plurality of residue condensers 86 are positioned at different levels, and receive the decoded numerical data from the modulo 15 decoders 84. Further, each residue condenser 86 is connected to two residue condensers 86 from a previous stage, and a single residue condenser 86 is provided in the last stage of the residue-generation tree 80. The present invention is not limited to the use of a modulo 15 residue-generation tree, and may vary as necessary. Further, according to an embodiment of the present invention, the residue condensers may be a plurality of adders or a series of decoders and multiplexers, for example.

Further, as shown in FIG. 4, according to an exemplary embodiment of the present invention, the residue-generation tree 80 further includes a multiplexer 90. According to one embodiment, the multiplexer 90 is a 4-bit multiplexer, however, the present invention is not limited hereto, and may vary as necessary. The multiplexer 90 may be a 3 or 5-bit multiplexer, for example. According to embodiments of the present invention, the multiplexer 90 may be provided at the register-bits inputs or outputs. In FIG. 4, the multiplexer 90 selectively provides logical zeros or a correction value at the inputs of the respective registers-bits carrying unused bits (as indicated by the arrow 91, for example). Since the multiplexer 90 may be provided at the register-bits inputs or outputs, the correction-value may be supplied to the unused bits at the register-bits inputs or outputs. Every bit of the operand register 82 has a defined contribution to the resulting residue value. There is a repetitiveness of validity of a bit, e.g., when calculating residue 15 each bit has a contribution of either 1, 2, 4 or 8 and these contribution values repeat from bit 0 to 31 for a 32-bit register. Thus, the present invention is not limited to applying the correction value to bits 28 through 31 and may be applied to any unused bits within the register-bits of the operand register 82. According to an embodiment of the present invention, a correction value may be selectively provided by the multiplexer 90 to correct while calculating the residue value via the residue generator 46b. Control logic (not shown) determines when a correction is needed for an executed floating point operation (e.g., if an increment or round-up is needed, if an adder-carry should supply a correction value e.g. by +1, or specified corrections for negative numbers). Thus, according to one embodiment, when residue correction is necessary, a correction value may be applied via the multiplexer and if a correction is unnecessary, the multiplexer 90 assigns logical zeros to the register-bits carrying the unused bits.

According to one embodiment, when the decoded numerical data including the logical zeros or the correction value when provided is input into the residue condensers 86 connected with the modulo 15 decoders 84, outputs are generated from the respective residue condensers 86. The outputs are then input into a pair of residue condensers 86 in the next stage and the outputs of the pair of residue condensers 86 are then input into the residue condenser 86 in the last stage of the residue-generation tree 80. The residue condenser 86 in the last stage receives the outputs from the residue condensers 86 in the previous stage and calculates the residue value and corrects while calculating the residue value by adding a correction value of between zero and the maximum residue value, when provided by the multiplexer 90.

According to one embodiment, in the case of the modulo 15 residue-generation tree shown in FIG. 4, a correction value may be applied as a hexadecimal value between zero and 15. Due to the mathematical properties of residues, negative values can be achieved by applying their complement to the maximum residue value, e.g., a correction of −1 can be obtained by applying a value of 14 (binary: "1110"); a correction of −2 can be reached by applying a value of 13 (binary: "1101" to the correction-inputs. Typical usages for such corrections show up in designs where an adder produces a carry-bit, or when special operations need an input-bit to be forced to one. Typically, correction values of +1, +2, −1, or −2 are used. The present invention is not limited hereto, and may vary accordingly.

Figure 5:
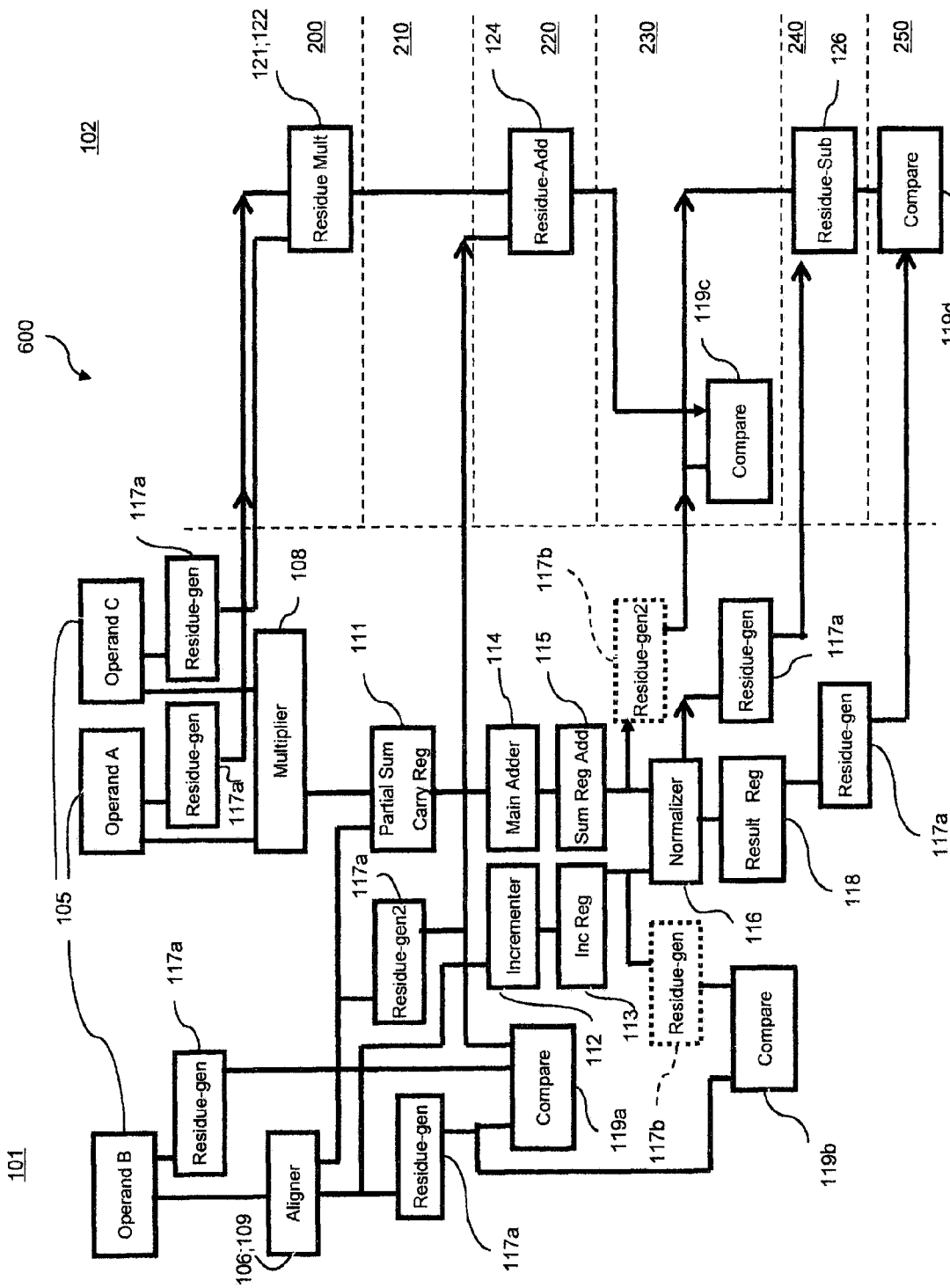
FIG. 5 is a schematic diagram illustrating a distributed residue checking apparatus including residue generators that can be implemented within alternative embodiments of the present invention.

FIG. 5 is a schematic diagram illustrating a distributed residue checking apparatus as disclosed in U.S. patent application Ser. No. 12/253,713 entitled "Distributed Residue-Checking of a Floating Point Unit" filed on Oct. 17, 2008 by Son T. Dao et al., which is incorporated herein by reference. According to an embodiment of the present invention, the residue generators according to an embodiment of the present invention may be employed in a distributed residue checking apparatus. Therefore, some of the residue generators shown in FIG. 5 function in a same manner as those shown in FIG. 4, for example. As shown in FIG. 5, some of the features are the same as those features shown in FIG. 3 therefore, a detailed description of these features has been omitted. In FIG. 5, a FPU 600 including a data flow 101 and a checking flow 102 is illustrated. In the data flow 101, a plurality of operands A, B and C are input via an input register 105. A plurality of functional elements 106 is also provided to perform floating-point operations on the plurality of operands A, B and C. According to one embodiment, the functional elements 106 include a multiplier 108, an aligner 109, a partial sum and carry register 111, an incrementer 112, an incrementer register 113, a main adder 114, a sum register 115 for the main adder 114 and a normalizer 116. According to an embodiment of the present invention, the multiplier 108, the aligner 109, the incrementer 112 and the main adder 114 may be switched off to enable power-saving within the FPU 600 upon instruction.

Further, according to an embodiment of the present invention, the data flow 101 includes a plurality of residue generators 117a and 117b that calculate residue values within the FPU 600. According to one embodiment of the present invention, the residue generators 117b (as indicated by the dashed boxes) calculate residue values and correct the calculated residue value, simultaneously. The residue values are generated by the residue generators 117a and 117b at specified positions within the data flow 101. According to one embodiment of the present invention, the residue generators 117a and 117b have either approximately 64 bits data flow capacity or 128 bits, for example. That is, some of the residue generators have a wider data flow capacity, to thereby accommodate the output of the aligner 109, for example. The present invention is not limited to hereto, and may vary as necessary.

In the data flow 101, operands A, B and C are input via the input register 105 in parallel. As shown in FIG. 5, operands A and C are multiplied via the multiplier 108, while operand B which is to be added to the results of the multiplier 108 at a later pipeline stage, is input into and shifted via the aligner 109. Residue values of the operands A, B, C are generated by respective residue generators 117a. The results at the aligner 109 and the results from the multiplier 108 are then input to the partial sum and carry register 111. The results of the aligner 109 and the multiplier 108 are added together in the main adder 114 and the sum is placed in the sum register add 115. Residue values of the aligner 109 are generated by respective residue generators 117a.

As further shown in FIG. 5, the results of the aligner 109 are also input into and incremented via the incrementer 112 based on instructions provided. The results of the incrementer 112 are then input into the incrementer register 113. The results of the incrementer register 113 and the sum register add 115 are input into the normalizer 116 which performs a normalization operation. Residue values of the results of the incrementer register 113 and the sum register add 115 are calculated by respective residue generators 117b, and corrected by the respective residue generators 117b, when necessary in the same manner as described with reference to FIGS. 3 and 4 and described below in more detail.

According to an embodiment of the present invention, the residue generators 117b function in a same manner as the residue generators 46b shown in FIG. 3. That is, residue generators 117b perform both residue calculation and correction. These residue generators 117b are positioned at the outputs of the incrementer register 113 of the incrementer 112 and the sum register add 115 of the main adder 114. Since minor corrections to the calculated residue values of the incrementer 112 and the main adder 114 are sometimes necessary when forcing an adder carry-in or when incrementing a value via the incrementer 112, a correction-value can be supplied at the same time. Therefore, the residue generators 117b calculate and correct residue values, simultaneously. That is, the residue generators 117b may modify the input received in the operand register 82 (as shown in FIG. 4, for example) and then calculate the residue value.

Further shown in FIG. 5, the results of the normalizer 116 are then input into a result register 118 and residue values of the normalizer-loss 116 and the result register 118 are then calculated at a respective residue generator 117a. According to an embodiment of the present invention, the distributed residue checking apparatus performs distributed residue checking operations of the residue values calculated by the residue generators 117a and 117b as described below.

According to an embodiment, the distributed residue checking apparatus includes a plurality of residue checking units including a first residue checking unit 119a, a second residue checking unit 119b, a third residue checking unit 119c and a fourth residue checking unit 119d, distributed throughout the data flow 101 and the checking flow 102 of the FPU 600. Each residue checking unit 119a through 119d receives a first residue value and a second residue value from respective residue generators 117a or 117b and compares the first residue value to the second residue value to determine whether the first and second residue values are equal. The respective residue checking unit 119a, 119b, 119c or 119d produces an error signal, when the first and second residue values are not equal, which indicates an error has occurred during performance of the floating-point operation performed by the respective functional element 106.

The first residue checking unit 119a compares the residue value from the operand B to the residue value resulting from the aligner 109. According to one embodiment, the residue value resulting from one functional element 106 and input into a residue checking unit in one pipeline stage may also be input into another residue checking unit in a subsequent pipeline stage. This eliminates the need for an additional residue generator as input reference for a later pipeline stage residue comparator. For example, the residue value result of the aligner 109 used by the first residue checking unit 119a in one pipeline stage is also forwarded via a stage-register to the second residue checking unit 119b to be used in the next pipeline stage. Thus, one clock cycle later, the second residue checking unit 119b compares the residue value of the aligner 109 to the residue value of another functional element 106 (i.e., the incrementer 112) to determine whether the data is correct.

According to an embodiment of the present invention, in the checking flow 102, a plurality of residue arithmetic elements 121 are provided to perform residue arithmetic operations on the residue values calculated by the residue generators 117a and 117b. The residue calculating elements 121 may include a residue multiplier 122, a residue add 124 and a residue subtract 126, for example. The present invention is not limited hereto, and may vary as necessary. The residue arithmetic elements 120 are used to verify calculations performed by the multiplier 108 and the main adder 114, for example.

At a first stage 200 of the checking flow 102, the residue values of the operands A and C are first multiplied via the residue multiplier 122. Next, in the second stage 210, the product of the residue multiplier 120 is forwarded, and in the third stage 220 the product of the residue multiplier 122 and the residue value of the aligner 109 are added via the residue add 124. In the fourth stage 230, the residue value of the main adder 114 and the result of the residue add 124 are compared via the third residue checking unit 119c, to check the accuracy of the multiplier 108 and the main adder 114.

In the fifth stage 240, the residue value of the data bits lost in the normalizer 116 is subtracted from the residue value of the main adder 114 via the residue subtract 126. In the sixth stage 250, the results of the residue subtract 126 are then compared to the residue value from the result register 118 via the fourth residue checking unit 119d.

According to an embodiment of the present invention, a number of the residue checking units 119a through 119d are independent from the remaining residue checking units 119a through 119d.

The residue generator according to embodiments of the present invention includes a residue-generation tree that utilizes unused input bits by applying a necessary correction value to those input bits via a multiplexer. The control logic determines if a correction is needed for an executed instruction (e.g., if an increment or round-up is needed, or whether an adder-carry should correct the residue-value) and applies the appropriate correction value to the formerly unused input bits of the residue-generation trees of residue-generators 117b. Thus, the present invention provides the advantage of calculating a residue value and correcting the residue value using the same circuitry and without extra delay. Thus, the block 19 of FIG. 1 of the conventional art checking is not needed here.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A residue generator of a residue checking apparatus for calculation and correction of a residue value, the residue generator comprising:
    a residue-generation tree connected with an operand register at an input of the residue generator, which includes a plurality of register-bits to receive and carrying bits of numerical data, the residue-generation tree comprising:
    a multiplexer connected with respective register-bits which carry unused bits and selectively provides at least one of logical zeros or a correction value based on the correction value being provided, at the respective register-bits carrying the unused bits, by muxing the correction value onto the unused bits;
    a plurality of decoders, each decoder to receive the bits of numerical data from the respective registers-bits that include the least one of logical zeros or the correction value based on the correction value being provided and decoding the numerical data; and
    a plurality of residue condensers positioned at different levels to receive the decoded numerical data from the decoders to include the at least one of logical zeros or the correction value based on the correction value being provided, to calculate the residue value and correct based on calculating the residue value using the correction value based on the correction value being provided by the multiplexer.

2. The residue generator of claim 1, wherein the decoded numerical data is configured to be input into a plurality of residue condensers connected with the decoders, and the plurality of residue condensers are connected with one another such that an output of each residue condenser is input into another residue condenser in a next stage of the residue-generation tree, and a residue condenser of a last stage of the residue-generation tree is to receive the outputs from the residue condensers in a previous stage and calculates the residue value and corrects based on the residue value being calculated by adding a correction value of between zero and a maximum residue value, based on being provided by the multiplexer.

3. A distributed residue checking apparatus for a floating point unit having a plurality of functional elements performing floating-point operations on a plurality of operands, the distributed residue checking apparatus comprising:
    a plurality of residue generators which calculate residue values for the operands and the functional elements and comprising specified residue generators of the plurality of residue generators which calculate the residue values and correct the calculated residue values, simultaneously, the specified residue generators each comprise:
    a residue-generation tree connected with an operand register at an input of each specified residue generator, including a plurality of register-bits to receive and carrying bits of numerical data, the residue-generation tree comprising:
        a multiplexer connected with respective register-bits which carry unused bits and selectively provides at least one of logical zeros or a correction value based on the correction value being provided, at the respective register-bits carrying the unused bits, by muxing the correction value onto the unused bits; and
    a plurality of residue checking units distributed throughout the floating point unit, each residue checking unit to receive a first residue value and a second residue value from respective residue generators and to compare the first residue value to the second residue value to determine whether an error has occurred in a floating-point operation performed by a respective functional element.

4. The distributed residue checking apparatus of claim 3, wherein the specified residue generators each comprise:
    a plurality of decoders, each decoder to receive the bits of numerical data from the respective registers-bits that include the least one of logical zeros or the correction value based on the correction factor being provided and decoding the numerical data; and
    a plurality of residue condensers positioned at different levels to receive the decoded numerical data from the decoders to include the at least one of logical zeros or the correction value based on the correction value being provided to calculate the residue value and correct based on calculating the residue value using the correction value based on the correction value being provided by the multiplexer.

5. The distributed residue checking apparatus of claim 4, wherein the decoded numerical data is configured to be input into a plurality of residue condensers connected with the decoders, and the plurality of residue condensers are connected with one another such that an output of each residue condenser is input into another residue condenser in a next stage of the residue-generation tree, and a residue condenser of a last stage of the residue-generation tree is to receive the outputs from the residue condensers in a previous stage and calculates the residue value and corrects based on residue value being calculated by adding a correction value of between zero and a maximum residue value, based on being provided by the multiplexer.

6. The distributed residue checking apparatus of claim 5, wherein the fundamental elements comprise a multiplier, an aligner, an incrementer and an adder, and the specified residue generators of the plurality of residue generators correspond to the adder and the incrementer respectively, and calculate a residue value and correct the residue value simultaneously for the adder and the incrementer, respectively.

7. The distributed residue checking apparatus of claim 6, further comprising:
a plurality of residue arithmetic elements responsive to residue values calculated by the residue generators, to perform residue arithmetic operations on the calculated residue values, wherein the residue arithmetic operations are the same as the floating point operations performed by the fundamental elements, and residue results of the residue arithmetic operations are compared to calculated residue values of the fundamental elements via respective residue checking units to determine whether an error has occurred in the floating-point operations performed by the respective fundamental elements.

8. A method of calculating and correcting a residue value via a residue generator including a residue-generation tree, the method comprising:
receiving and carrying bits of numerical data in an operand register having a plurality of register-bits;
selective providing, via a multiplexer, at least one of logical zeros or a correction value at respective register-bits carrying unused bits, wherein the multiplexer is connected with the respective register-bits carrying the unused bits;
decoding, via decoders, the bits of numerical data including the at least one of logical zeros or the correction value based on the correction value being provided;
inputting to a plurality of residue condensers, the decoded numerical data including the at least one of logical zeros and correction value based on the correction value being provided; and
calculating the residue value and correcting the residue value based on calculating, via the plurality of residue condensers based on the correction value being provided by the multiplexer.

9. The residue generator of claim 1, wherein the multiplexer is a 4-bit multiplexer.

10. The residue generator of claim 1, wherein a 32-bit operand is processed.

11. The residue generator of claim 1, wherein the residue-generation tree is a modulo15 residue-generation tree.

12. The method of claim 8, wherein the multiplexer is a 4-bit multiplexer.

13. The method of claim 8, wherein a 32 bit-operand is processed.

14. The method of claim 8, wherein modulo15 residue generation is performed.

15. The method of claim 8, further comprising:
calculating the residue value via a residue condenser of the plurality of plurality of residue condensers which is positioned at a last stage within the residue-generation tree, and
correcting the residue value by adding a correction value of between zero and a maximum residue value based on calculating and the correction value being provided by the multiplexer.

16. A distributed residue checking apparatus for a floating point unit having a plurality of functional elements performing floating-point operations on a plurality of operands, the distributed residue checking apparatus comprising:
a plurality of residue generators which calculate residue values for the operands and the functional elements and comprising specified residue generators of the plurality of residue generators which calculate the residue values and correct the calculated residue values, simultaneously, the specified residue generators each comprise:
a residue-generation tree connected with an operand register at an input of each specified residue generator, including a plurality of register-bits to receive and carrying bits of numerical data, the residue-generation tree comprising:
a multiplexer connected with respective register-bits which carry unused bits and selectively provides at least one of logical zeros or a correction value based on the correction value being provided, at the respective register-bits carrying the unused bits, by muxing the correction value onto the unused bits;
a plurality of residue checking units distributed throughout the floating point unit, each residue checking unit to receive a first residue value and a second residue value from respective residue generators and to compare the first residue value to the second residue value to determine whether an error has occurred in a floating-point operation performed by a respective functional element;
a plurality of decoders, each decoder to receive the bits of numerical data from the respective registers-bits including the least one of logical zeros or the correction value based on the correction value being provided and decoding the numerical data; and
a plurality of residue condensers positioned at different levels to receive the decoded numerical data from the decoders to include the at least one of logical zeros or the correction value based on the correction value being provided to calculate the residue value and correct based on calculating the residue value using the correction value based on the correction value being provided by the multiplexer, wherein the decoded numerical data is configured to be input into a plurality of residue condensers connected with the decoders, and the plurality of residue condensers are connected with one another such that an output of each residue condenser is input into another residue condenser in a next stage of the residue-generation tree, and a residue condenser of a last stage of the residue-generation tree is to receive the outputs from the residue condensers in a previous stage and calculates the residue value and based on the residue value being calculated by adding a correction value of between zero and a maximum residue value, based on being provided by the multiplexer; and
a multiplier, an aligner, an incrementer and an adder that are fundamental elements, and the specified residue generators of the plurality of residue generators correspond to the adder and the incrementer respectively, and calculate a residue value and correct the residue value simultaneously for the adder and the incrementer, respectively.

17. A distributed residue checking apparatus for a floating point unit having a plurality of functional elements performing floating-point operations on a plurality of operands, the distributed residue checking apparatus comprising:

a plurality of residue generators which calculate residue values for the operands and the functional elements and comprising specified residue generators of the plurality of residue generators which calculate the residue values and correct the calculated residue values, simultaneously, the specified residue generators each comprise:

a residue-generation tree connected with an operand register at an input of each specified residue generator, including a plurality of register-bits to receive and carrying bits of numerical data, the residue-generation tree comprising:

a multiplexer connected with respective register-bits which carry unused bits and selectively provides at least one of logical zeros or a correction value based on the correction value being provided, at the respective register-bits carrying the unused bits, by muxing the correction value onto the unused bits;

a plurality of residue checking units distributed throughout the floating point unit, each residue checking unit to receive a first residue value and a second residue value from respective residue generators and to compare the first residue value to the second residue value to determine whether an error has occurred in a floating-point operation performed by a respective functional element;

a plurality of decoders, each decoder to receive the bits of numerical data from the respective registers-bits including the least one of logical zeros or the correction value based on the correction value being provided and decoding the numerical data; and a plurality of residue condensers positioned at different levels to receive the decoded numerical data from the decoders to include the at least one of logical zeros or the correction value based on the correction value being provided to calculate the residue value and correct based on calculating the residue value using the correction value based on the correction value being provided by the multiplexer, wherein the decoded numerical data is configured to be input into a plurality of residue condensers connected with the decoders, and the plurality of residue condensers are connected with one another such that an output of each residue condenser is input into another residue condenser in a next stage of the residue-generation tree, and a residue condenser of a last stage of the residue-generation tree is to receive the outputs from the residue condensers in a previous stage and calculates the residue value and based on the residue value being calculated by adding a correction value of between zero and a maximum residue value, based on being provided by the multiplexer; and a multiplier, an aligner, an incrementer and an adder that are fundamental elements, and the specified residue generators of the plurality of residue generators correspond to the adder and the incrementer respectively, and calculate a residue value and correct the residue value simultaneously for the adder and the incrementer, respectively; and a plurality of residue arithmetic elements responsive to residue values calculated by the residue generators, to perform residue arithmetic operations on the calculated residue values, wherein the residue arithmetic operations are the same as the floating point operations performed by the fundamental elements, and residue results of the residue arithmetic operations are compared to calculated residue values of the fundamental elements via respective residue checking units to determine whether an error has occurred in the floating-point operations performed by the respective fundamental elements.

* * * * *